United States Patent [19]

Ply

[11] 4,220,426
[45] Sep. 2, 1980

[54] TUBULAR PNEUMATIC CONVEYOR PIPELINE

[76] Inventor: Lemuel L. Ply, Rte. 1, Box 354-E, Wimberley, Tex. 78676

[21] Appl. No.: 973,286

[22] Filed: Dec. 26, 1978

[51] Int. Cl.³ ............................................. B65G 53/18
[52] U.S. Cl. ..................................................... 406/89
[58] Field of Search ....................... 406/45, 86, 89, 93, 406/94, 95

[56] References Cited

U.S. PATENT DOCUMENTS

| | | | |
|---|---|---|---|
| 3,253,865 | 5/1966 | Kanics | 406/86 |
| 3,558,195 | 1/1971 | Kanics | 406/95 |
| 3,929,379 | 12/1975 | Krambrock | 406/95 |
| 4,116,491 | 9/1978 | Ply | 406/89 |

FOREIGN PATENT DOCUMENTS

| | | | |
|---|---|---|---|
| 449393 | 9/1927 | Fed. Rep. of Germany | 406/95 |
| 1150320 | 6/1963 | Fed. Rep. of Germany | 406/89 |
| 2737536 | 11/1978 | Fed. Rep. of Germany | 406/95 |
| 1113755 | 5/1968 | United Kingdom | 406/89 |

Primary Examiner—James L. Rowland
Attorney, Agent, or Firm—Michael P. Breston

[57] ABSTRACT

A pneumatic tubular conveyor pipeline is provided for conveying solid products, for example, in granular or chunk form. The conveyor pipeline comprises an outer impervious pipe and a smaller-diameter inner porous pipe. The inner pipe has longitudinally-spaced, unidirectional pressure responsive vents dividing the inner pipe into chambers. A gas pressure source is connected to the upstream portion of the inner pipe. A feed apparatus is connected to the feed end of the outer pipe for injecting the product into and propelling same through the outer pipe. The chambers vent consecutively through the vents in the downstream direction at a rate determined by the product flow through the outer pipe, as the surrounding portions of the outer pipe become filled with the product.

2 Claims, 7 Drawing Figures

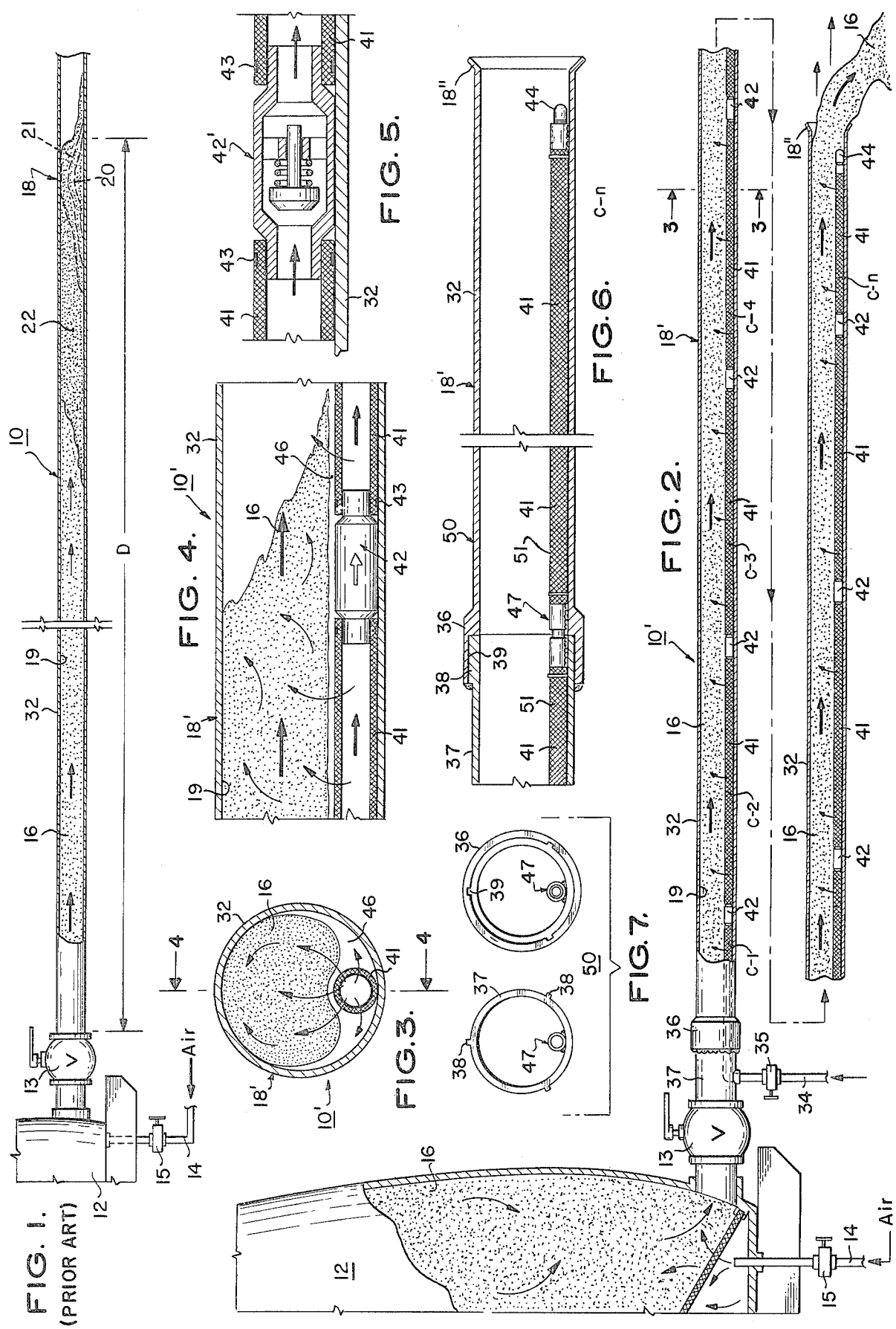

4,220,426

TUBULAR PNEUMATIC CONVEYOR PIPELINE

BACKGROUND OF THE INVENTION (a) Field of the Invention

This invention relates to a pneumatic conveyor system for conveying substantially dry materials over very long distances, such as is described in my U.S. Pat. No. 4,116,491.

(b) Description of the Prior Art

Conventional pneumatic pipe conveyor systems transport materials in suspension by means of a high-velocity air stream. The principal uses for such pipe conveyor systems are the the transport of materials such as granular cork, bran, carbon black, copra, grain, wood chips, and saw dust. One such known system for transporting pulverized materials consists of a motor-driven pump and of a source of compressed air for fluidizing the material. The material itself is fed from a bin or hopper into a pump mechanism which is of the screw type. Compressed air is admitted from a cylindrical manifold into the discharge end of the screw, thus changing the material into a semi-fluid substance before allowing it to enter the transport line. The greatest present use of such a system is believed to be for transporting bulk cement.

Such a system is obviously restricted as to the types of materials that can be transported, especially over long distances. Since this system depends upon suspension of the materials in a high-velocity air stream, serious limitations are imposed due to pressure drop, especially over long distances. Heavier materials fall out of the air stream and gradually cause pressure surges and clogging of the transport duct. As would be expected, the known systems operate more efficiently through straight runs and do not easily tolerate sharp bends and vertical sections.

Due to the required high-velocity air stream, the conventional systems also create severe dust problems at the discharge end of the conduit, thus requiring dust collectors which add to the expense of the system. Even the suction type of pneumatic conveyor also requires a dust collector at its discharge end.

Various other types of conveyor systems have been proposed in the patent literature, such as a pipeline having an impervious outer pipe and a porous inner pipe. The products are transported by the inner pipe. However, the initial leakage of air pressure downstream of the conveyed product from the porous pipe places a severe limitation on the length of the pipeline that can be used. For this reason such proposed systems have not been commercially acceptable.

A very practical system, however, is described in my said U.S. Pat. No. 4,116,491. Other systems have been made of record in my said patent. All these systems can be characterized by an inner porous pipe carrying the products to be transported.

SUMMARY OF THE INVENTION

The present invention utilizes a conveyor pipeline comprising a porous inner pipe, which is the fluidizing pipe, and an outer impervious pipe which is the product-carrying pipe and which forms a housing about the inner pipe. An air pressure source is connected to the upstream portion of the inner pipe. One-way pressure relief valves are longitudinally spaced-apart in the inner pipe thus dividing the inner pipe into chambers. The chambers vent consecutively through the valves, in the direction of product flow, only when the surrounding portions of the outer pipe become filled with sufficient product to create enough back pressure to operate the pressure relief valves. Thus the chambers become consecutively pressurized. The air pressure from each pressurized chamber flows through its porous wall into the outer pipe, whereby an air cushion is formed around the porous wall on which the conveyed product can float with reduced resistance. The air stream flowing from the porous wall also produces a fluidizing effect which tends to reduce the load on the source of compressed air used in propelling the product. The combined effects tend to prevent clogging of the product-carrying line due to drag and gravitational settling of the product along its downstream path in the outer pipe.

In a preferred embodiment, the outlet of a feed hopper is connected to the outer pipe. One end of an air jet pipe is coupled to the inner pipe. The other end of the jet pipe is suitably connected to a compressed air or gas source. As more and more product is being forced into the outer pipe, the product gradually forms a mass against which the air pressure from the inner pipe can push. The air entering from the porous wall of the inner pipe into the outer pipe tends to form an air cushion under the product, and also tends to create a fluidizing effect which greatly reduces friction and allows the air pressure from the inner pipe to assist in propelling the product through the outer pipe.

The chambers' valves consecutively open in the direction of product flow, as the porous walls of the chambers become progressively covered by the product, thus creating the required back pressures on the valves. The one-way pressure relief valves prevent unnecessary loss of air pressure downstream of the porous pipe except when needed.

Preferably, the porous pipe is positioned at the bottom of the impervious outer pipe, thereby tending to overcome the gravitational pull on the products being transported.

BRIEF DESCRIPTION OF THE DRAWINGS

FIG. 1 is a schematic view of a typical prior art conveyor system;

FIG. 2 is a schematic view, partly in section, of a pneumatic conveyor system utilizing the very long product conveyor pipe in accordance with this invention, FIG. 3 is a sectional view taken on line 3—3 of FIG. 2 showing the fluidizing air cushion formed under the conveyed product;

FIG. 4 is a fragmentary view taken on line 4—4 of FIG. 3;

FIG. 5 is an enlarged sectional view showing one type of pressure relief valve used in the porous pipe;

FIG. 6 illustrates a conveyor pipe, such as is shown in FIG. 2, which can be made up from sections, and one manner of interconnecting such sections of conveyor pipe; and FIG. 7 shows end views of the mating ends of adjacent pipe sections shown in FIG. 6.

DESCRIPTION OF PREFERRED EMBODIMENTS

In FIG. 1 is shown a prior art system 10 which comprises a conveyor pipeline 18 having an impervious pipe 32 which is coupled through a suitable valve 13 to a feed hopper 12 containing a granular product 16. When the granular product 16 is to be conveyed by pipeline 10 from hopper 12 to a remote location, a valve 15 is opened and a propelling air stream is made to flow from a pipe 14 connected to an air pressure source (not shown). The air jet draws the product 16 from hopper 12 and jets the aerated product into bore 19 of pipe 32. After a sufficient volume of the product is injected into pipe 18, the product will begin to mass at a location, generally designated as 22. The product 16 becomes progressively dense and forms mounts which are designated by dotted lines 20, 21. Eventually, at distance D from hopper 12 depending on the nature of product 16, the product will fall out of the air stream and gradually cause clogging at pipe 18. The product will then stop moving downstream of mount 21. The distance D may be several hundred feet or more. Hence conveyor system 10 is definitely limited as to the distance to at which the product can be conveyed.

In FIGS. 2–7 is shown a preferred conveyor system 10' of this invention which is not so limited as to distance. In system 10' the same numerals will designate the same parts and similar parts will be designated with the same reference characters followed by a prime (').

The pneumatic conveyor pipeline 18' of this invention is coupled through a short pipe 37 and valve 13 to the lower end of feed hopper 12 containing, for example, a granular product 16. Pipe 37 is welded to the bell 36 of pipeline 18'. The pipeline 18' consists of an impervious outer pipe 32 having a bore 19, and of a porous, relatively-small diameter, hollow pipe 41 which is preferably mounted on the bottom of bore 19, as viewed in FIG. 2. The porous inner pipe 41 contains a plurality of longitudinally-spaced, uni-directional, pressure-responsive control vents, generally designated as 42, forming chambers C-1 to C-n therebetween. An air conduit 34 is coupled through a valve 35 to the first chamber C-1.

Each vent 42 can comprise a spring-biased, one-way, pressure-relief valve 42' (FIG. 5) which is coupled to a pair of adjacent chambers in pipe 41 by suitable clamps 43. The most remote chamber C-n is sealed off by a plug 44. All the valves 42' are normally-closed and biased to open in the same direction.

In operation, when the product 16 is to be conveyed by pipeline 10 from hopper 12 to a remote location, valve 15 is opened and an air jet produced by pipe 14 will draw out the product from hopper 12 and jet it into the bore 19 of the impervious pipe 32. Simultaneously, valve 35 is opened and the air pressure from conduit 34 will continuously fill the first chamber C-1 whose valve 42' is closed. When a sufficient volume of the product 16 is injected into bore 19 of pipe 32, the product will form a mass against which the air pressure, leaking through the porous wall of the first chamber C-1, can be exerted (FIG. 3).

As the product moves downstream, i.e., to the right (as viewed in FIG. 2), the pressure in the first chamber C-1 builds up and reaches a back pressure which is sufficient to overcome the spring resistance of the first valve 42', thereby causing it to open (FIGS. 4, 5).

This open valve now allows the second chamber C-2 to become gradually pressurized, as the product 16 moves downstream, until its valve 42' will open. This process will be repeated until all the chambers C-n become progressively pressurized. After the last chamber C-n is pressurized, product 16 will be discharging through the pipeline's discharge end 18'', as shown in FIG. 2.

It will be apparent that a particular chamber C-x will start to pressurize only after its immediately preceeding chamber C-(x−1) is fully pressurized.

FIG. 3 schematically illustrates with the aid of arrows that the air stream passing through the porous wall of any chamber in pipe 41 forms a continuous air cushion 46 underneath the mass of product 16 and also aerates and fluidizes the product. As the product moves downstream through the impervious pipe 32, it is supported by and rides on the air cushion 46. Since an air stream is being continuously lost through the porous pipe 41, air pressure must be continuously supplied thereto through pipe 34.

By suitably designing the pore sizes in the inner pipe 41, large granular or chunk products such as ore, coal, etc., may be transported by the pipeline 10'. The pipeline can also be adapted for the transportation of products at elevated temperatures.

Pipeline 18' can be made up from conveyor pipe sections 50 each having a bell 36 (FIGS. 6, 7) at one end, and a pin 37 at the other end thereof. A plurality of angularly-spaced guides 38 on the outer periphery of pin 37 fit inside a plurality of corresponding grooves 39 inside bell 36. The porous pipe sections 51 of inner pipe 41 in the pipe sections 50 can be interconnected by hollow couplings 47 of conventional design. In this manner air pressure can freely flow between the interconnected sections 51 when pipeline 18' of this invention is fully assembled. The last porous pipe section 51 is terminated by the plug 44 of conventional design.

As will be readily appreciated from the above description, when taken in conjunction with the drawings the present invention lends itself to modifications and all such are intended to be covered by the claims attached hereto.

What is claimed is:

1. A conveyor pipeline for conveying solid products, comprising:
    (a) an outer, impervious pipe having upstream an inlet for receiving a gas-propelled, granulated solid product and for conveying same to an outlet downstream thereof;
    (b) a porous, relatively-small diameter, inner pipe disposed inside and extending substantially throughout the length of said outer pipe; the inlet to the bore of the inner pipe, upstream of said pipeline, receiving pressurized gas, and the pores in the wall of said inner pipe being continuously open;
    (c) a plurality of one-way, pressure-responsive valves longitudinally spaced apart inside the bore of the inner pipe, whereby each section of the bore between a pair of consecutive valves forms a chamber; each valve being normally closed and being biased to open only in the downstream direction by a predetermined pressure drop across the valve, said pressure drop being produced, in use, when the inlet to the bore of the inner pipe receives pressurized gas and product in the bore of the outer pipe builds up around the porous wall of the valve's chamber, thereby causing the back pressure on the valve to exceed the bias of the valve; said valves consecutively open at the rate determined by the product flow through the bore of said outer pipe; and each chamber as it becomes pressurized causes gas to escape through its continually open pores in the wall thereof into the bore of the outer pipe, thereby forming an air cushion under the moving product, and assisting in fluidizing the product.

2. The conveyor pipeline of claim 1, wherein the bore of the inner pipe is closed at the downstream end thereof and the inner pipe is disposed at the bottom of the outer pipe.

* * * * *